United States Patent [19]
Johnson et al.

[11] Patent Number: 5,846,301
[45] Date of Patent: Dec. 8, 1998

[54] FINE-PARTICULATE AND AEROSOL REMOVAL TECHNIQUE IN A CONDENSING HEAT EXCHANGER USING AN ELECTROSTATIC SYSTEM ENHANCEMENT

[75] Inventors: Dennis W. Johnson, Barberton; Robert B. Myers, Norton; Karl H. Schulze, North Canton; Ralph T. Bailey, Uniontown, all of Ohio

[73] Assignee: McDermott Technology, Inc., New Orleans, La.

[21] Appl. No.: 869,335

[22] Filed: Jun. 5, 1997

Related U.S. Application Data

[62] Division of Ser. No. 566,381, Dec. 1, 1995, Pat. No. 5,792,238.

[51] Int. Cl.[6] .................................................. B03C 3/014
[52] U.S. Cl. ........................... 96/52; 96/55; 96/74; 96/88
[58] Field of Search .................... 96/52, 53, 74, 96/83, 88, 92, 55; 95/58, 60, 63–67, 71–73; 55/222

[56] References Cited

U.S. PATENT DOCUMENTS

| | | | |
|---|---|---|---|
| 2,020,976 | 11/1935 | Udy | 423/318 |
| 2,805,768 | 9/1957 | Lawver | 209/11 |
| 4,349,367 | 9/1982 | Krumwiede | 65/27 |
| 4,482,351 | 11/1984 | Kitazawa et al. | 209/127.2 |
| 4,487,139 | 12/1984 | Warner | 110/345 |
| 4,555,933 | 12/1985 | Johnston | 73/28.02 |
| 4,557,202 | 12/1985 | Warner | 110/216 |
| 4,705,101 | 11/1987 | Warner | 165/104.31 |
| 4,892,139 | 1/1990 | LaHaye et al. | 165/95 |
| 5,282,429 | 2/1994 | Kato et al. | 110/344 |
| 5,282,885 | 2/1994 | Cameron | 95/66 |
| 5,510,087 | 4/1996 | Johnson et al. | 55/222 X |
| 5,534,230 | 7/1996 | Johnson et al. | 55/222 X |
| 5,567,215 | 10/1996 | Bielawski et al. | 55/222 |
| 5,792,238 | 8/1998 | Johnson et al. | 95/60 |

*Primary Examiner*—Richard L. Chiesa
*Attorney, Agent, or Firm*—Robert J. Edwards; Eric Marich

[57] ABSTRACT

An integrated flue gas treatment condensing heat exchanger having a particle charger located upstream of the second stage heat exchanger of the system for improved cleaning of flue gas and increased removal of fine particulate matter.

3 Claims, 4 Drawing Sheets

FINE-PARTICULATE AND AEROSOL REMOVAL TECHNIQUE IN A CONDENSING HEAT EXCHANGER USING AN ELECTROSTATIC SYSTEM ENHANCEMENT

This is a division of application Ser. No. 08/566,381 filed Dec. 1, 1995, now U.S. Pat. No. 5,792,235.

BACKGROUND OF THE INVENTION

1. Field of the Invention

The invention relates to a new and useful apparatus and method for removing particulate matter or other contaminants from furnace flue gases, and in particular, to the use of an electrostatic particle charging and collection system in a new location for the removal of contaminants contained in flue gases formed during the combustion of waste materials, coal, oil and other fossil fuels, burned by electric power generating plants or other industrial processes.

2. Description of the Related Art

A known apparatus for integrated heat recovery and removal of particulates, sulfur oxides/acid gases and other contaminants from a hot combustion exhaust gas includes condensing heat exchangers. This type of heat exchanger can recover both sensible and latent heat from the flue gas in a single unit. A common arrangement is for the gas to pass down through the heat exchanger while the water passes upward in a serpentine path through the tubes. Condensation occurs within the heat exchanger as the gas temperature at the tube surface is brought below the dew point. The condensate falls as a constant rain over the tube array and is removed at the bottom. Gas cleaning occurs within the heat exchanger by the mechanisms of absorption, condensation, and impaction as the gas is cooled below the dew point.

The heat exchanger tubes and inside surfaces of the heat exchanger shell are made of corrosion resistant material or are covered with a coating, such as "TEFLON" brand coatings, to protect them from corrosion when the flue gas temperature is brought below the acid dew point. Interconnections between the heat exchanger tubes are made outside the tube sheet and are not exposed to the corrosive flue gas stream.

Another known apparatus is an integrated flue gas treatment (IFGT™) system, which is a condensing heat exchanger designed to enhance the removal of particulates, sulfur oxides/acid gases and other contaminants from the flue gas stream. The heat exchanger tubes and inside surfaces of the heat exchanger shell are also made of corrosion resistant material or are "TEFLON" covered. There are five (5) major sections of an integrated flue gas treatment system; the first heat exchanger stage, the interstage transition, the second heat exchanger stage, the reagent spray system and the mist eliminator.

Most of the sensible heat is removed from the gas in the first heat exchanger stage of the integrated flue gas treatment system. The interstage transition can be equipped with water and/or alkali spray systems. The spray systems saturate the flue gas with moisture before it enters the second heat exchanger stage and also assist in removing particulates, sulfur oxides/acid gases and other contaminants from the gas. The interstage transition is made of fiberglass-reinforced plastic or other corrosion resistant materials.

The second heat exchanger stage is operated in a condensing mode, removing latent heat and pollutants from the gas. The upper section of the second heat exchanger stage is equipped with an alkali solution spray system. The gas in this stage is flowing upward while the spray droplets move downward. This counter-current gas/droplet flow provides a scrubbing mechanism that enhances the capture of particulates, sulfur oxides/acid gases and other contaminants. The captured particulates, sulfur oxides/acid gases and other contaminants that are contained in the falling condensate/reacted alkali solution droplets are collected at the bottom of the interstage transition. The flue gas outlet of the integrated flue gas treatment system is also equipped with a mist eliminator to reduce the possibility of moisture carryover. The integrated flue gas treatment system condensing heat exchangers are effective at removing particulate matter. In tests on oil, coal, and "ORIMULSION" (a suspension of bitumen in water), the removal of particulate shows an increase in removal efficiency with increasing particle size. On average, more than 60% of the particulate matter of 1–2 microns and larger in size is removed. Almost all particles larger than 5–10 microns are removed.

However, the removal of fine particulate (less than 1–2 microns, including the submicron range) has been limited to 50% or less. The low removal rate for fine particulate matter is due partly because impaction and interception mechanisms for particulate collection are less efficient for submicron size particles. Additionally, it can result from particle growth due to condensation and hydration of the fine particles, and the formation of aerosols such as $H_2SO_4$ (sulfuric acid) mist as the flue gas cools. It is apparent that significant improvement in overall particulate removal would be accomplished by improving the removal of fine particulates and aerosols from the flue gas.

Another important reason for removing the fine fraction is that it includes heavy metals (normally oxides, though other species will be present) and other air toxics. It is often necessary to control the emission of these contaminants to comply with environmental regulations.

Electrostatic precipitators are well known in the field as being useful for improving the removal of fine particulate from flue gases.

Several patents teach the use of electrostatic precipitators for charging particles in an exhaust gas. U.S. Pat. No. 2,020,976 to Udy contemplates condensation of acidic liquid in a chamber below an electrostatic precipitator. It also discloses the grounding of the walls of the precipitator for attracting charged particles to be removed from the exhaust.

Other patents disclose the use of electrostatic precipitators as a last stage before an exhaust stack, for example, U.S. Pat. No. 2,805,768 to Lawver, U.S. Pat. No. 4,349,367 to Krumwiede, and U.S. Pat. No. 4,482,351 to Kitazawa, et al.

U.S. Pat. No. 5,282,429 to Kato, et al. discloses a dry electrostatic precipitator flanked by a gas-gas heat exchanger and similar heat exchanger on opposite sides of the flow. Neither heat exchanger is of the condensing type and this is consistent with other teachings which appear to suggest utilizing precipitating heat exchangers in a dry environment only.

Several patents disclose the construction of electrostatic precipitators per se, such as the Johnston U.S. Pat. No. 4,555,933 and the LaHaye, et al. U.S. Pat. No. 4,892,139.

SUMMARY OF THE INVENTION

It is a primary object of the invention to further increase the particulate removal from flue gases created during the combustion of waste materials or fossil fuels which are burned in electric power plants, process steam plants and other industrial processes.

Accordingly, an integrated flue gas treatment condensing heat exchanger utilizing an electrostatic particle charging and collection system within the condensing stages is disclosed. By imparting a charge on the small particles or droplets in the integrated flue gas treatment heat exchanger, electrostatic forces can be used to improve the collection efficiency. The similarly charged particles or droplets will repel each other and move toward a grounded surface. The condensing heat exchanger surfaces condense water and acid gases out of the flue gas. These wet surfaces act as a grounding surface and assist in the collection of the charged particles.

Additionally, an alkali reagent may also be used in the integrated flue gas condensing heat exchanger system to further enhance the removal of sulfur dioxide from the flue gas. Liquids condensed in the integrated flue gas treatment condensing heat exchanger will be either acidic or basic and, thus, good conductors which act as a grounded surface.

The invention is an integrated flue gas treatment arrangement having two condensing heat exchanger stages connected in series by an interstage transition region and capable of introducing an electrostatic charge onto the particulates or droplets in the flue gas at one or more locations. The integrated flue gas treatment system can be operated with the first heat exchanger stage in the condensing mode to enhance particulate removal. The second heat exchanger stage is operated with an alkali reagent spray to promote particulate/$SO_2$ removal and provide a conducting path to ground for the charged particulate.

The electrostatic charges are imparted to the particulate or droplets by passing them through a strong electric field. The particles can be charged with either an electrostatic precipitator (wire/rod and plate) or atmospheric ionizers (corona discharge around a pointed electrode). The charged particulate and droplets will travel with the flue gas and migrate to the ground where they are collected. The particles and droplets are charged with similar polarity charges and are removed in the regions of the integrated flue gas treatment system having conducting surface to ground.

In one embodiment, a charging mechanism such as that used in an electrostatic precipitator charges the particles before they enter the first condensing heat exchanger stage. The charged particles drift apart while passing through the first heat exchanger stage and into the transition region where collection occurs as the particles come into contact with the wet conducting walls or surfaces. Additional particulate removal occurs as the remaining particles enter the second heat exchanger stage.

In a second embodiment, each heat exchanger stage is made up of modules that are stacked on top of each other. The heat exchanger tubes are aligned horizontally and mounted in a staggered array within each module. The charging mechanism is located adjacent the top of the first heat exchanger stage where the average flue gas temperature is still above the acid dew point. One of the top modules is preferably selected to contain the charging mechanism. The charging mechanism includes at least two rows of tubes within the selected module, which have the "TEFLON" covering removed. These tubes are connected to ground potential.

Conducting rods are placed within the heat exchanger. The conducting rods are located between, and run parallel to, the bare metal heat exchanger tubes. The conducting rods are isolated from ground and maintained at a high electrical potential. The location of the conducting rods is equidistant from the surface of each of the adjacent tubes. The particulate in the gas is charged as the contaminated flue gas flows between the charged rods and bare metal tubes. Droplets that form as a result of condensation are also charged. The charged particulate and droplets are collected in the wet transition region and the second heat exchanger stage.

In a preferred embodiment, a corona discharge ionizer is used in the integrated flue gas treatment condensing heat exchanger. The corona discharge ionizer may be located at either end of the transition section directly below one of the heat exchanger stages of the integrated flue gas treatment. According to its location, the ionizer is oriented either in the direction of or in the opposite direction of the flue gas stream flow.

Instead of using air or flue gas in the ionizer, saturated steam is used. The ionizer is designed so that the steam is condensing as it passes through the corona discharge region. The condensing steam leaving the ionizer is charged and interacts with the flue gas in the transition section. The charged droplets attract the particulates in the flue gas and capture them. The droplets containing the particles are collected on the transition region or second heat exchanger stage surfaces.

In a fourth embodiment, the device used to charge the droplets and particles is placed within the transition region. Any known type of electrostatic precipitator may be used. The charged droplets and particulates are collected on the wetted walls of the transition region or within the second heat exchanger stage.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
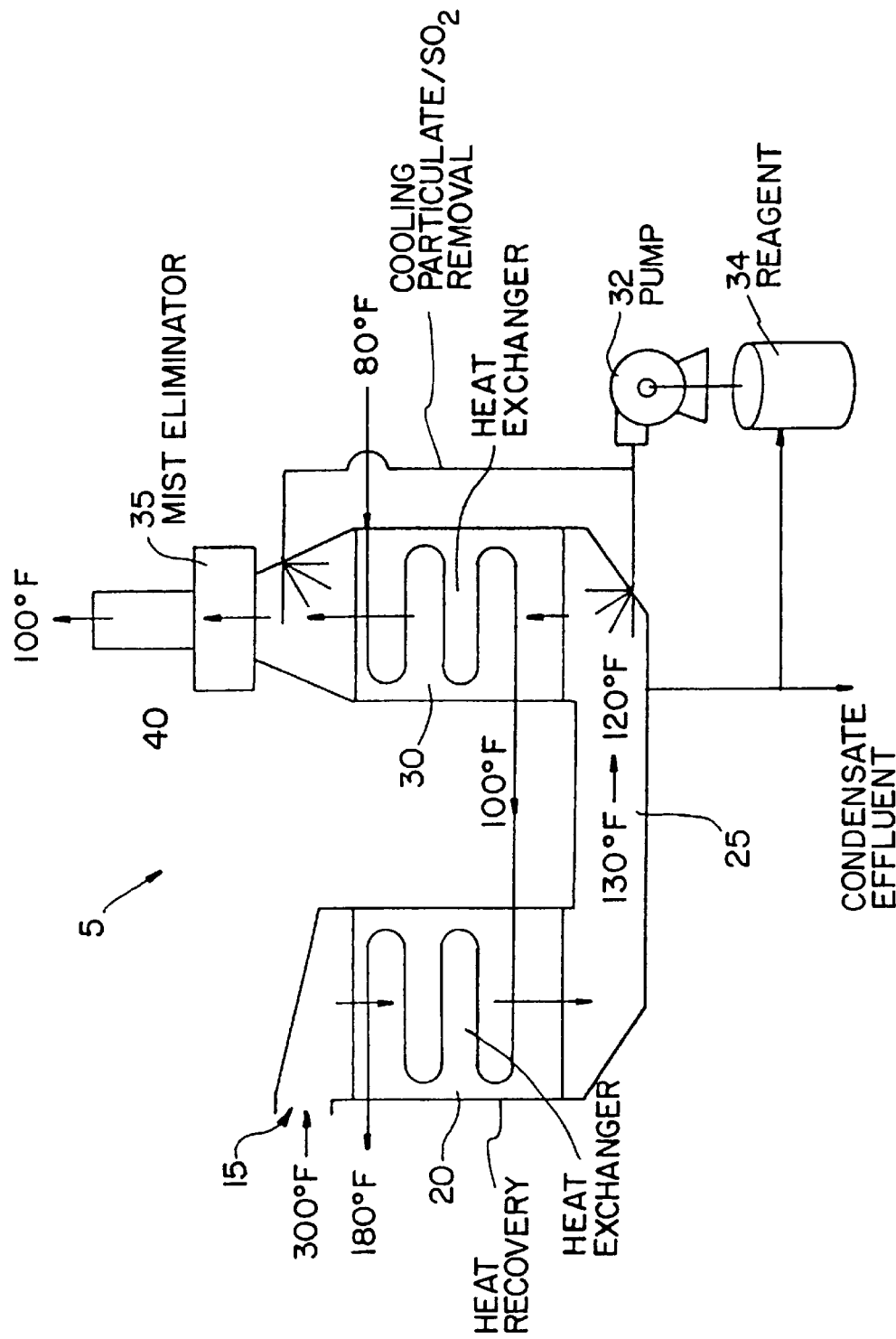
FIG. 1 is a schematic drawing of a known type of condensing heat exchanger system.

Turning now to the drawings in particular, wherein like numerals are used to indicate the same or similar parts, FIG. 1 is a schematic diagram of a typical integrated flue gas treatment condensing heat exchanger without the particle charger of the present invention. The condensing heat exchanger, generally designated 5, has flue gas inlet 15 on top of first stage heat exchanger 20. Heat exchanger 20 is connected at its bottom end to transition region 25, which leads to second stage heat exchanger 30. Second stage heat exchanger 30 is provided with a alkali reagent spray pump 32 and alkali source 34. Reagent is forced to the top regions of the second stage heat exchanger by pump 32, where it falls like rain through the heat exchanger 30 and intermingles with the flue gas. Reagent may also be introduced into the transition region between the two heat exchanger stages. Mist eliminator 35 is situated atop second stage heat exchanger 30 to eliminate residual droplets, which may be rising with the flue gas to flue gas outlet 40, located above mist eliminator 35.

As can be seen from the diagram, flue gas enters at flue gas inlet 15 at a temperature of approximately 300° F. It then proceeds downward through the first stage heat exchanger 20, passing around a plurality of heat exchanging tubes located perpendicular to the flow of gas. The flue gas then passes into the transition region 25, where further cooling takes place before the flue gas enters the second stage heat exchanger 30 and begins to rise toward flue gas outlet 40.

As explained above, the reagent spray is introduced to the upper regions of heat exchanger 30 and contacts the flue gas rising through second stage heat exchanger 30. The wet scrubbing of the gas cleans certain chemical components from the flue gas and causes them to be collected in the transition region 25 below the second stage heat exchanger 30. The scrubbed flue gas then continues to rise through mist eliminator 35, where entrained droplets of condensate or spray are removed from the flue gas. Flue gas then continues to flue gas outlet 40, where it may be furthered cleaned or exited through a stack.

Figure 2:
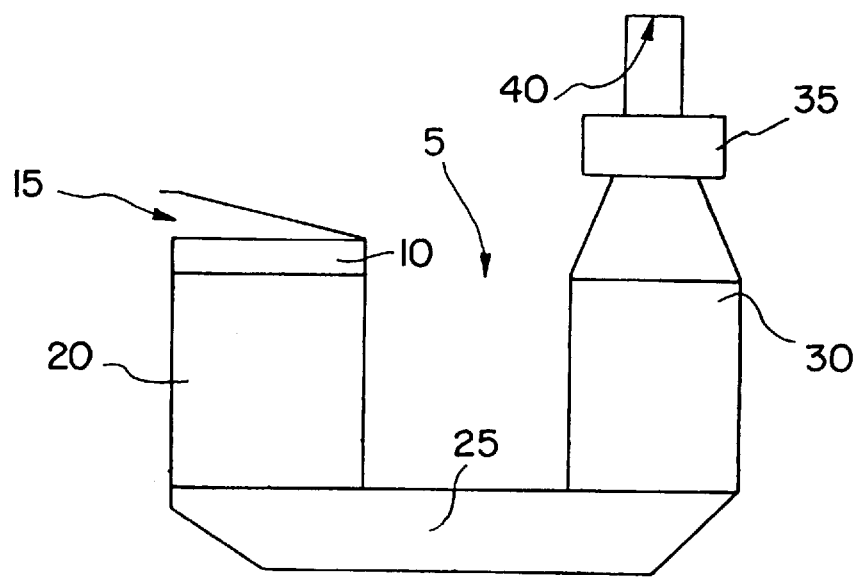
FIG. 2 is a schematic drawing of one embodiment of the present invention.

In FIG. 2, one embodiment of the present invention is shown. In an integrated flue gas treatment condensing heat exchanger 5, an electrostatic particle charging mechanism 10 is located between flue gas inlet 15 and first stage heat exchanger 20. First stage heat exchanger 20 and second stage heat exchanger 30 are connected by transition region 25. Mist eliminator 35 is located between second stage heat exchanger 30 and flue gas outlet 40.

In the configuration shown in FIG. 2, any known type of electrostatic charging mechanism such as an electrostatic precipitator may be used to charge the fine particulate in the flue gas entering through flue gas inlet 15, before it passes to first stage heat exchanger 20. The charged particles enter the first heat exchanger 20 and begin to drift apart and are forced to transition region 25. In transition region 25, the charged particles are attracted toward the wet conducting walls of the transition region 25, where they are collected and removed from the flue gas. The flue gas then continues through the second stage heat exchanger 30, where further cleaning of the flue gas is done. The flue gas then exits the condensing heat exchanger 5 through mist eliminator 35 and flue gas outlet 40.

Figure 3:
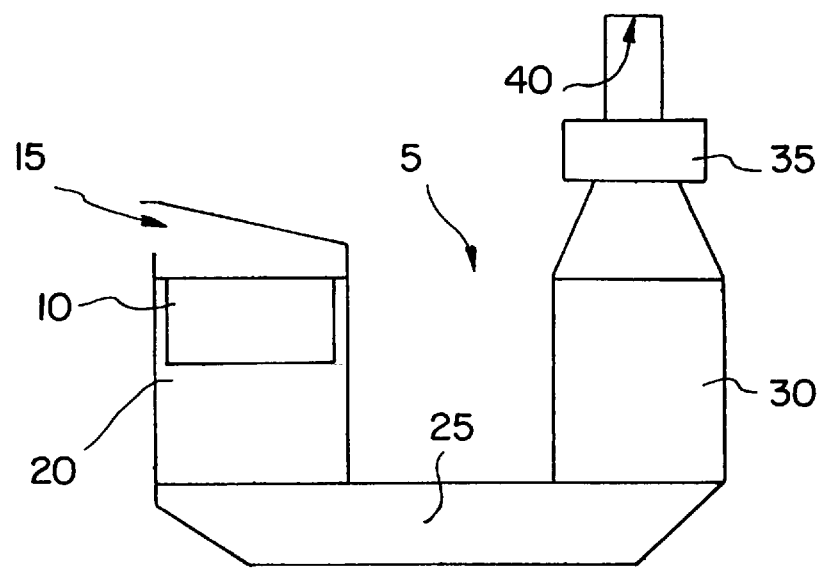
FIG. 3 is a schematic drawing of a second embodiment of the present invention.

In FIG. 3, the condensing heat exchanger 5 is shown with the particle charger 10 located within first stage heat exchanger 20 below flue gas inlet 15. Transition region 25 connects first stage heat exchanger 20 and second stage heat exchanger 30. Mist eliminator 35 is located atop second stage heat exchanger 30 and is connected to flue gas outlet 40.

In this embodiment, the particle charger 10 is an integral part of the first stage heat exchanger 20. Normally, the tubes (not shown) in a condensing heat exchanger assembly are "TEFLON" covered to prevent corrosion by acidic or basic chemicals which are formed when the flue gas is condensed. The heat exchanging tubes are placed in staggered rows, forming a triangular pattern between them. By placing the charging region near the upper end of the first stage heat exchanger 20 (non condensing region of the first heat exchanger stage), the non-conducting "TEFLON" covering may be removed from several of the heat exchanging tubes. At least the top two rows of the heat exchanging tubes have the "TEFLON" covering removed from the portions of the tubes inside the tubesheet. These tubes are connected to an electrical ground. Located between the bare tubes are a series of charging rods for delivering a charge to the fine particulate suspended within the flue gas which passes around the tubes at the entrance to the first stage heat exchanger 20.

Figure 6:
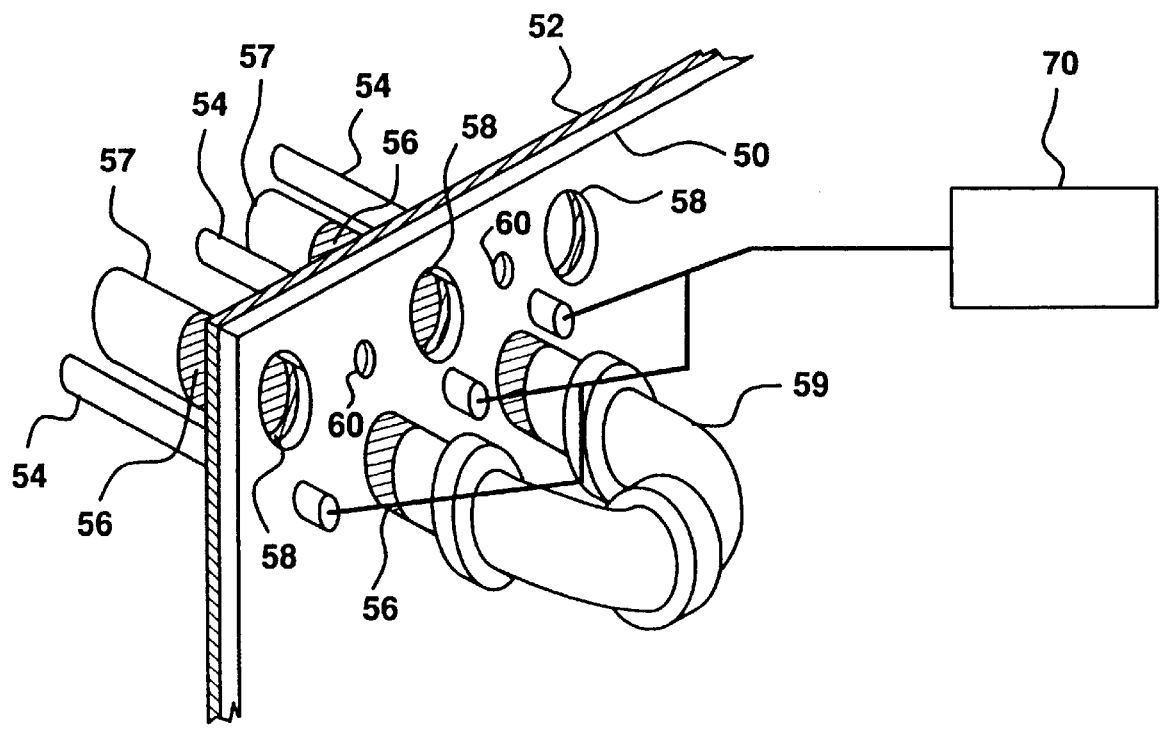
FIG. 6 is a sectional perspective view of the embodiment of FIG. 3.
Figure 7:
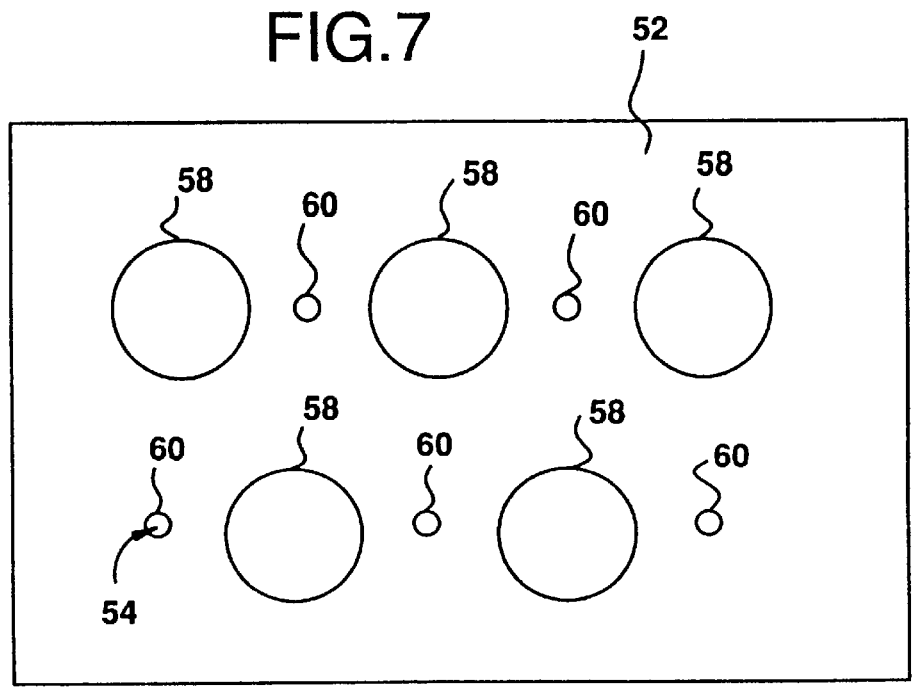
FIG. 7 is a side elevational view of the embodiment shown in FIG. 6.

The orientation of the tubes and charging rods are more clearly seen in FIGS. 6 and 7.

In FIG. 6, a section of the heat exchanger in which the particle charger is located, may be seen. The tube sheet 50 is coated on the interior side with "TEFLON" sheet 52. Copper tubes (or other conductive, suitable material) 57 pass through tube openings 58 and are interconnected with U-shaped members 59 outside the heat exchanging region. A portion of the copper tube is covered with a "TEFLON" coating 56, which forms a seal with "TEFLON" sheet 52 and prevents corrosive material from exiting the condensing heat exchanging area. In this embodiment, tube sheet 50 and "TEFLON" sheet 52 have a plurality of charging rod openings 60 through which charging rods 54 extend into the heat exchanging region parallel to the copper tubes 57. The charging rods 54 are electrically isolated from the tubesheet 50 by the "TEFLON" sheet 52, or other suitable electrical isolator.

As can be seen in the drawings, the charging rods 54 are also placed in staggered rows located at equal distances between copper tubes 57. The charging rods 54 are also connected to a charger 70, which imparts an electrical voltage to the rods. The conducting tubes 57, which are exposed and not covered by "TEFLON" coating 56 are grounded. Particles are charged as they pass through the strong electric field between the charging rods and the grounded tubes. The charged particles will then be collected as they fall to the bottom of the heat exchanging region.

FIG. 7 more clearly shows the orientation of the tube openings 58 and charger rod openings 60 with respect to each other. In this drawing, the charger rod openings 60 are positioned midway between adjacent tube openings 58 and on the same horizontal centerline as the tube openings 58.

Figure 4:
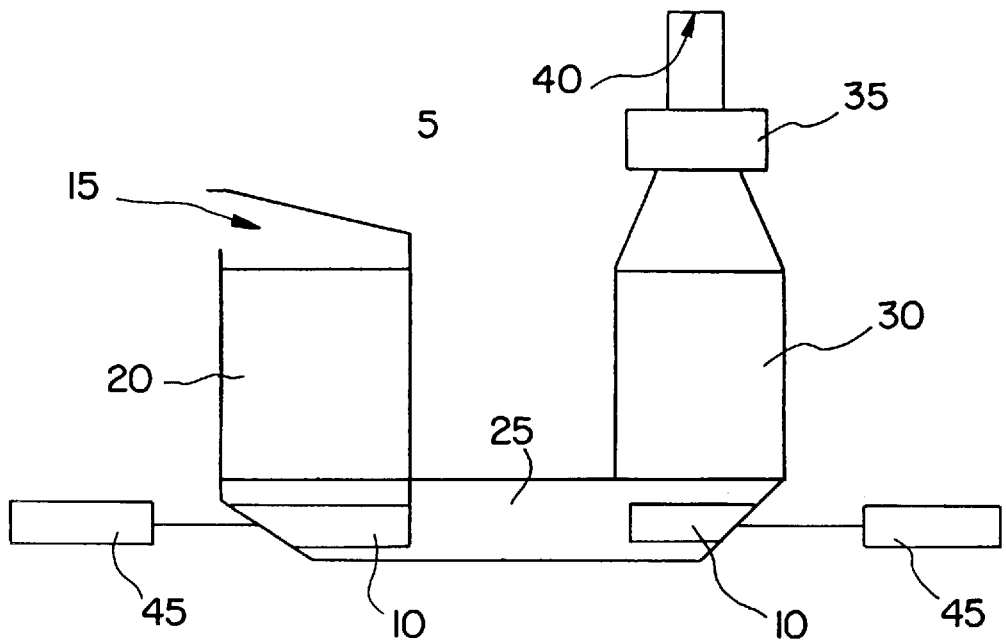
FIG. 4 is a schematic drawing of yet another embodiment of the present invention.

Turning now to FIG. 4, in a third embodiment of the invention, the particle charger 10 is located at either end of the transition region 25 of the condensing heat exchanger 5. In this embodiment, a source of finely dispersed water droplets or steam 45 is provided to the particle charger 10, which contains a known type of corona discharge and which is used to charge the droplets or steam 45 as it passes through the charger 10 and interacts with the contaminated flue gases. The charged steam droplets attract the particulates from the flue gas, collect them and cause them to be collected on the surfaces of transition region 25 where they are removed with the condensate and reagent.

In this embodiment, condensing heat exchanger 5 has flue gas inlet 15 atop first stage heat exchanger 20, which is connected to second stage heat exchanger 30 by transition region 25. Second stage heat exchanger 30 has mist eliminator 35 and flue gas outlet 40.

Figure 5:
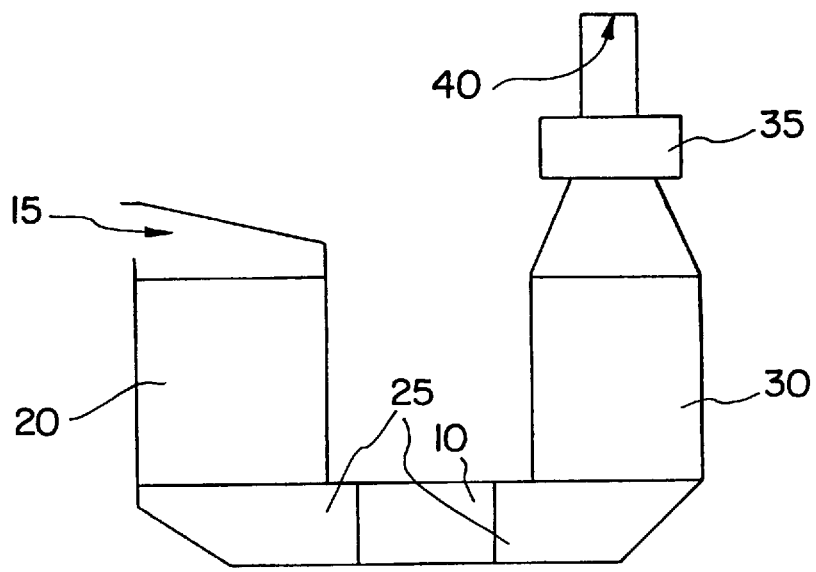
FIG. 5 is a schematic drawing of a fourth embodiment of the present invention.

Finally, in FIG. 5, a fourth embodiment of the invention is shown, wherein particle charger 10 is located within transition region 25 and may be any known type of electrostatic precipitator. In this embodiment, flue gas inlet 15 allows flue gas to enter first stage heat exchanger 20 which cools the flue gas and causes droplets to be formed, which then pass to the transition region 25 and through the particle charger 10 where droplets and particulate in the flue gas are electrically charged. The charged droplets and particulate are then attracted to the wetted walls of the transition region 25. The flue gas, with some remaining charged particles, then passes to second stage heat exchanger 30, where more small droplets and particulate are removed. The flue gas then passes through mist eliminator 35 to flue gas outlet 40.

While a specific embodiment of the invention has been shown and described in detail to illustrate the application of the principles of the invention, it will be understood that the invention may be embodied otherwise without departing from such principles.

What is claimed is:

1. An integrated flue gas treatment condensing heat exchanger for removing a fine particulate from a flue gas, comprising:

a first stage heat exchanger having a flue gas inlet at a first stage upper end and a flue gas outlet at a first stage lower end;

a second stage heat exchanger having a flue gas inlet at a second stage lower end and a flue gas outlet at a second stage upper end;

a transition region conduit connecting the flue gas outlet at the first stage lower end and the flue gas inlet at the second stage lower end;

a mist eliminator situated adjacent the flue gas outlet at the second stage upper end and having a flue gas outlet; and means for imparting an electrostatic charging field, said means including a plurality of charging rods oriented perpendicular to the flow of the flue gas, the charging rods being electrically insulated from and connected between a pair of opposing tube sheets and passing through one of a plurality of charging rod openings in each of said tube sheets, the rods being; arranged in an array of staggered rows and equidistant between a plurality of at least two rows of bare metal heat exchanging tubes arranged in a tube array of staggered rows and oriented parallel to the rods, the balance of the heat exchanging tubes covered with a coating to prevent them from corrosion, each of the tubes passing through one of a plurality of tube openings and connected between the pair of tube sheets, the tube sheets connected to the first stage heat exchanger, and the rods being electrically connected to means for providing an electrical charge to each rod.

2. A condensing heat exchanger according to claim 1, wherein the means for imparting an electrostatic charging field is located adjacent the first stage heat exchanger within the flue gas inlet.

3. A condensing heat exchanger according to claim 1, wherein the means for imparting an electrostatic charging field is located at the upper end of the first stage heat exchanger.

* * * * *